US006801385B2

(12) United States Patent
Matsuoka

(10) Patent No.: US 6,801,385 B2
(45) Date of Patent: Oct. 5, 2004

(54) RECORDING AND/OR REPRODUCING APPARATUS HAVING AN INCLINED GUIDE POST AND TAPE GUIDE RESTRICTING STRUCTURE

(75) Inventor: Hidetoshi Matsuoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 347 days.

(21) Appl. No.: 10/021,442

(22) Filed: Dec. 19, 2001

(65) Prior Publication Data

US 2002/0085306 A1 Jul. 4, 2002

(30) Foreign Application Priority Data

Dec. 28, 2000 (JP) ........................................ 2000-401557

(51) Int. Cl.[7] .................................................. G11B 15/66
(52) U.S. Cl. ...................................... 360/85; 360/130.23
(58) Field of Search ....................... 360/85, 95, 130.21, 360/130.22, 130.23, 130.24

(56) References Cited

U.S. PATENT DOCUMENTS 3,679,840 A * 7/1972 Maxey .................. 360/130.23
3,818,503 A * 6/1974 Hosono et al. ............... 360/85
3,911,491 A * 10/1975 Terao .......................... 360/85
4,410,920 A * 10/1983 Kawai ......................... 360/85
4,656,540 A * 4/1987 Kodama et al. .............. 360/85
4,875,126 A * 10/1989 Nakamichi ............. 360/130.23
5,089,921 A * 2/1992 Kodama et al. .............. 360/95
5,153,790 A 10/1992 Kobayashi et al. ........... 360/85
5,251,080 A 10/1993 Matsuoka et al. ............ 360/85
5,363,257 A 11/1994 Matsuoka .................... 360/85
5,469,309 A * 11/1995 Konishi et al. ............... 360/85
5,502,607 A * 3/1996 Ushiro et al. .......... 360/130.24
5,506,738 A * 4/1996 Tamura et al. .............. 360/132
5,550,686 A 8/1996 Matsuoka et al. ............ 360/85
5,808,827 A * 9/1998 Kumano et al. .............. 360/85
6,282,057 B1 * 8/2001 Konishi et al. ........ 360/130.23

FOREIGN PATENT DOCUMENTS

JP 5-151668 6/1993
JP 7-182745 A * 7/1995

* cited by examiner

*Primary Examiner*—Jefferson Evans
(74) *Attorney, Agent, or Firm*—Fitzpatrick, Cella, Harper & Scinto

(57) ABSTRACT

A recording and/or reproducing apparatus for recording and/or reproducing data by drawing a tape from a cassette and winding the tape onto a rotating drum including a head, includes a non-rotatable inclined post for changing the position of the tape in a direction crossing the running direction of the tape and along the axis of the inclined post, and a tapered part disposed in the vicinity of an end of the inclined post, for restricting the position of the tape in a direction crossing the running direction by being in contact with the tape when the tape is loaded.

10 Claims, 8 Drawing Sheets

2a
1
11
8
2

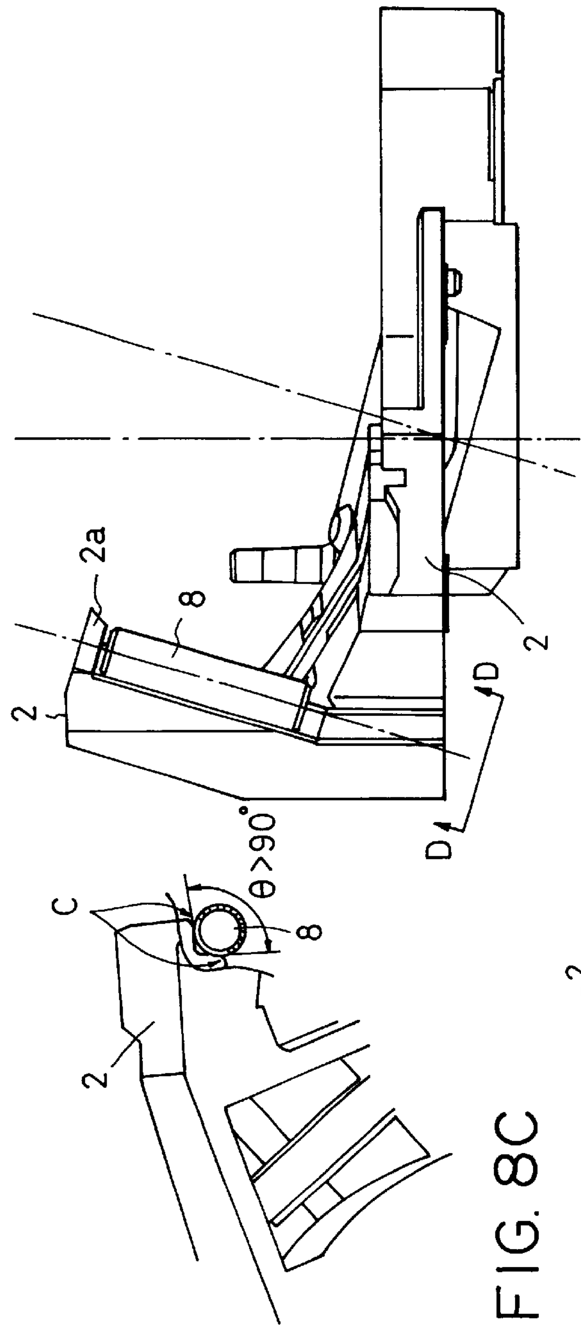
FIG. 8A
FIG. 8B
2a
8
2
D
D
2
θ>90°
C
8
2
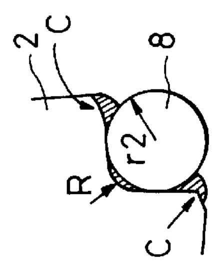
FIG. 8C
2
C
8
r2
R
C

RECORDING AND/OR REPRODUCING APPARATUS HAVING AN INCLINED GUIDE POST AND TAPE GUIDE RESTRICTING STRUCTURE

BACKGROUND OF THE INVENTION

1. Field of the Invention

The present invention relates to a recording and/or reproducing apparatus including a tape-loading unit for a video tape recorder.

2. Description of the Related Art

Hitherto, such a recording and/or reproducing apparatus has been generally provided with a non-rotatable post which is fixed to a drum base by press fitting, as disclosed in, for example, Japanese Patent Laid-Open No. 05-151668.

However, in the known example described above, the length of the post must be increased so that a tape-loading guide does not scratch a tape with the up-and-down movement of the tape loading guide when the tape is loaded. Therefore, a tape path must be increased to some extent, thereby increasing the size of the recording and/or reproducing apparatus.

SUMMARY OF THE INVENTION

Accordingly, it is an object of the present invention to provide a recording and/or reproducing apparatus in which a stress such as distortion applied to a tape when loading the tape is decreased and the tape can be loaded through a small tape path without being damaged, which can be produced at low manufacturing costs, and of which the size can be reduced.

According to an aspect of the present invention, a recording and/or reproducing apparatus for recording and/or reproducing data by drawing a tape from a cassette and winding the tape onto a rotating drum including a head, comprises a non-rotatable inclined post for changing the position of the tape in a direction crossing the running direction of the tape and along the axis of the inclined post; and a tapered part disposed in the vicinity of an end of the inclined post, for restricting the position of the tape in a direction crossing the running direction by being in contact with the tape when the tape is loaded.

Further objects, features and advantages of the present invention will become apparent from the following description of the preferred embodiments with reference to the attached drawings.

BRIEF DESCRIPTION OF THE DRAWINGS

FIG. 8A is a side view of an inclined post fixed to a drum base in a magnetic recording and/or reproducing apparatus according to a second embodiment of the present invention; FIG. 8B is a view, in a direction of arrows D, of the inclined post and the drum base shown in FIG. 8A, according to the second embodiment; and FIG. 8C is an expanded view of the inclined post, shown in FIGS. 8A and 8B, affixed by bonding.

DESCRIPTION OF THE PREFERRED EMBODIMENTS

Preferred embodiments according to the present invention are described below with reference to the attached drawings.

(First Embodiment)

Figure 1:
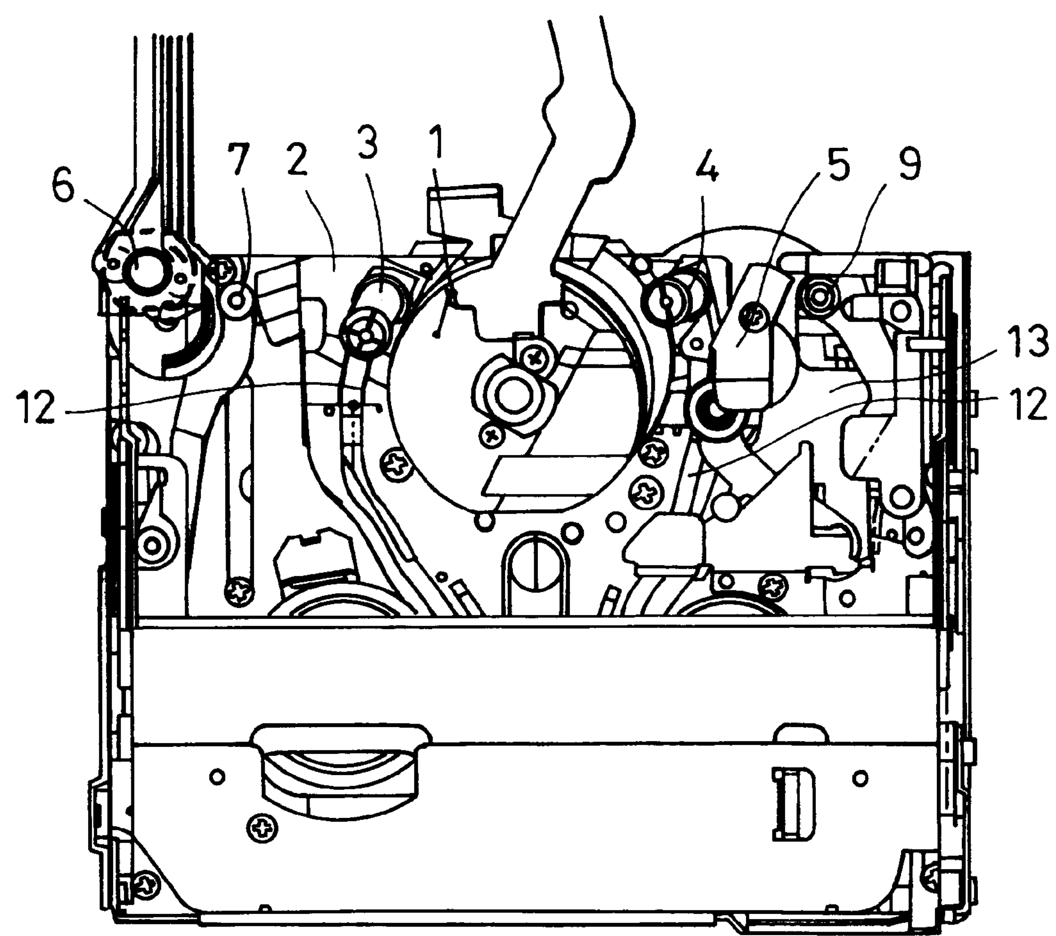
FIG. 1 is an illustration of a magnetic recording and/or reproducing apparatus in a loading state, according to an embodiment of the present invention.

In FIG. 1, a cassette is removed from a magnetic recording and/or reproducing apparatus which is used generally in the embodiments according to the present invention, in order to clearly show the inside of the recording and/or reproducing apparatus.

FIG. 1 shows a drum 1 including a magnetic head, and a drum base 2 for supporting the drum 1.

A supply-side guide 3 draws a tape from a cassette (not shown) when the cassette is loaded into the magnetic recording and/or reproducing apparatus. The supply-side guide 3 forms a predetermined tape path such that the supply-side guide 3 draws the tape when the cassette is loaded, moves the tape along a guide 12 formed in the drum base 2, and winds the tape onto the drum 1.

The supply-side guide 3 upward draws the tape while moving horizontally along the drum 1 so that the tape is wound onto the drum 1 in a spiral shape.

A takeup-side guide 4 draws the tape from the cassette when loaded into the magnetic recording and/or reproducing apparatus. The takeup-side guide 4 forms the predetermined tape path such that the takeup-side guide 3 draws the tape when the cassette is loaded, moves the tape along the guide 12 formed in the drum base 2, and winds the tape onto the drum 1.

A capstan 5 transfers the tape by forming the predetermined tape path.

A loading motor 6 drives to perform loading/unloading operations of the recording and/or reproducing apparatus.

A tension post 7 draws the tape from the cassette so as to form the predetermined tape path in cooperation with the guides 3 and 4 and controls the tension of the tape while the tape is running.

A return post 9 draws the tape from the cassette so as to form the predetermined tape path in cooperation with the guides 3 and 4.

FIG. 1 also shows a chassis 13.

The supply-side guide 3 and the takeup-side guide 4 are formed with rotating guide rollers for reducing the running load of the tape.

Figure 2:
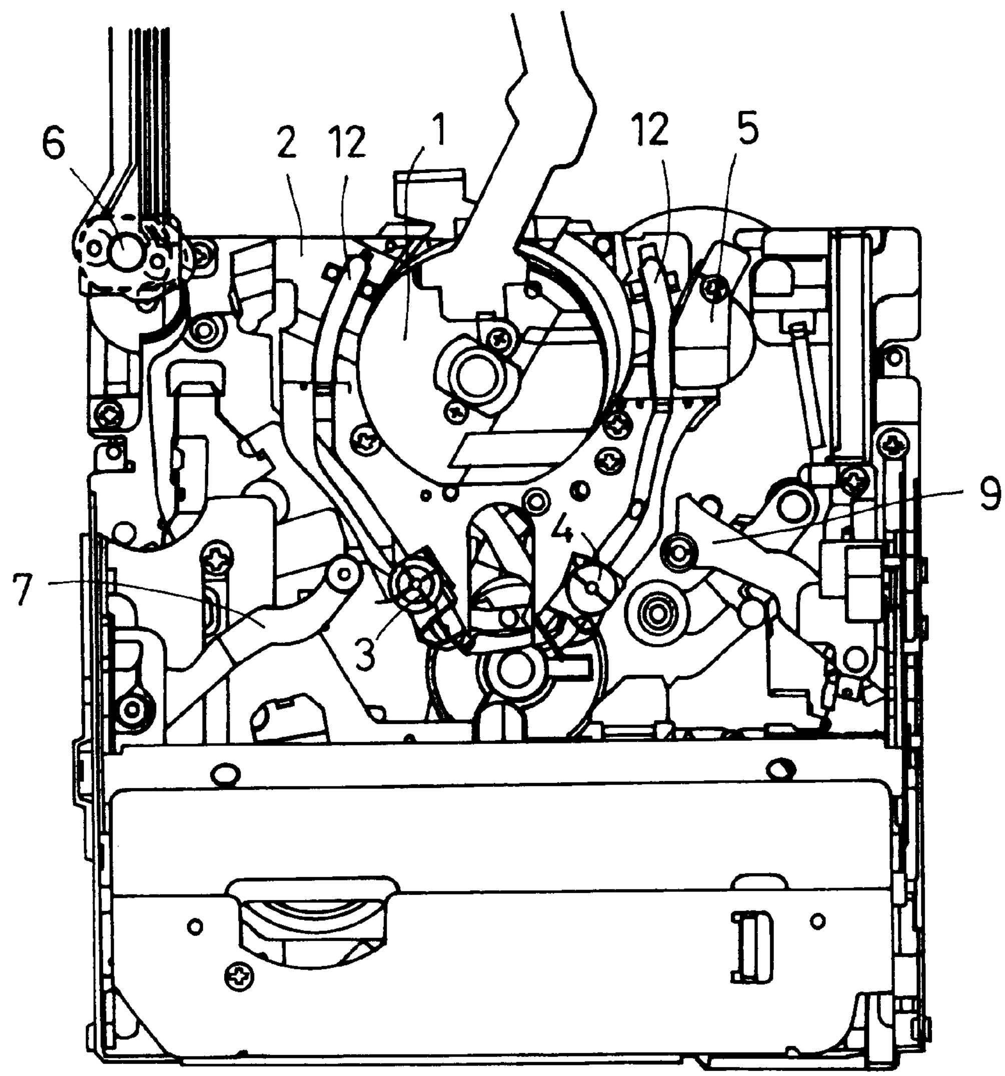
FIG. 2 is an illustration of the magnetic recording and/or reproducing apparatus in an unloading state, according to the embodiment of the present invention.

FIG. 2 is an illustration of the magnetic recording and/or reproducing apparatus in an unloaded state which is used generally in the embodiments according to the present invention. The guides 3 and 4, the tension post 7, and the return post 9 are disposed in a position at which the cassette mouth of the cassette is positioned when the cassette is loaded into the recording and/or reproducing apparatus.

Figure 3:
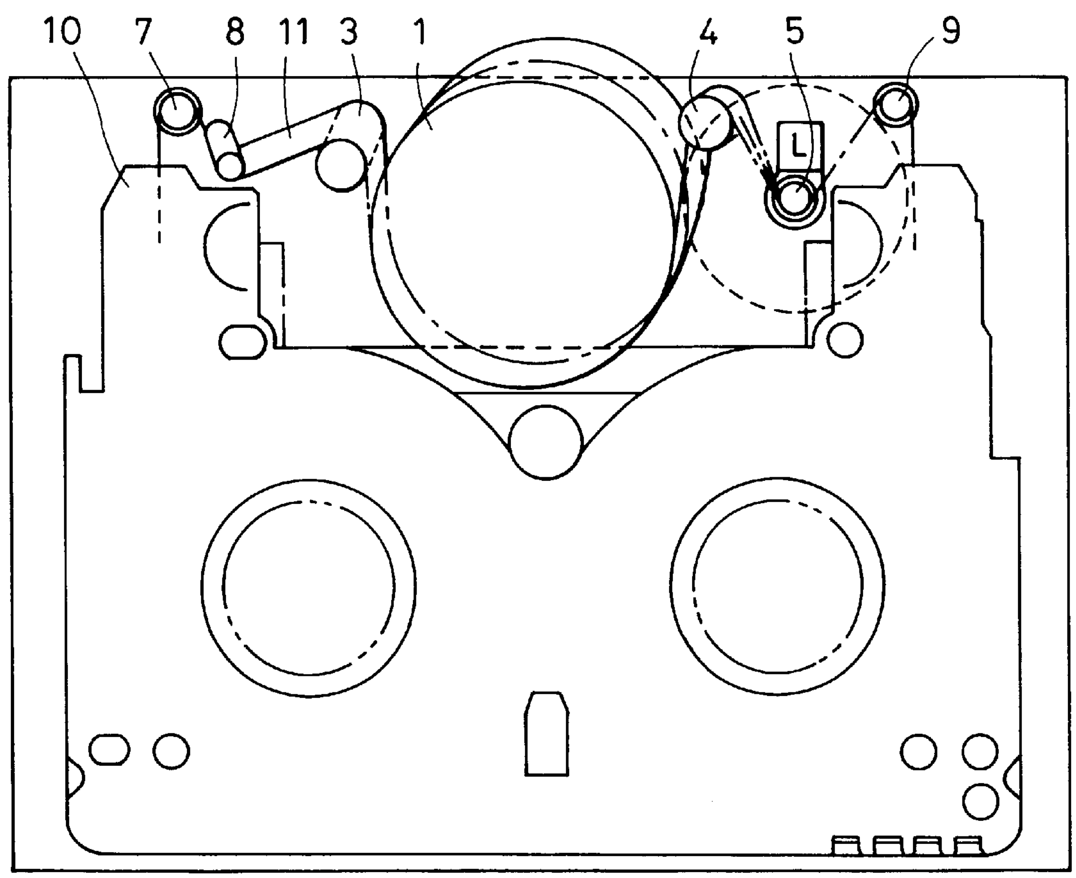
FIG. 3 is an illustration of a critical portion of the magnetic recording and/or reproducing apparatus according to the embodiment of the present invention, which shows a tape path.

FIG. 3 shows the predetermined tape path.

The drum 1 is positioned in the cassette mouth of a cassette 10.

A supply-side inclined post 8 comes into contact with the tape at the magnetic surface thereof.

The inclined post 8 is made of a metal so that the running resistance of the tape is reduced.

The tape drawn from the cassette 10 runs via the tension post 7, is bent upward from the inclined post 8, is wound in a spiral shape onto the drum 1, via the supply-side guide 3 and the takeup-side guide 4, at the lower part of the drum 1 from the upper left part toward the upper right part thereof, and is spooled into the cassette 10 via the capstan 5 and the return post 9.

A tape 11 is wound onto the drum 1 by an angle of rotation of the drum 1 of greater than 190 degrees.

The level of the tape 11 varies upward and downward at the supply side with respect to the drum 1, and the tape 11 runs substantially horizontally at the take-up side of the drum 1.

Figure 4:
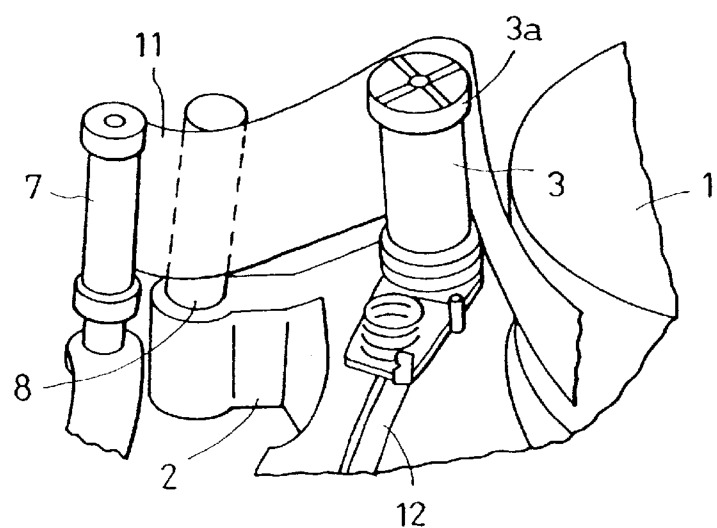
FIG. 4 is a perspective view of a known recording and/or reproducing apparatus in which a tape is loaded via a guidepost.

FIG. 4 is a perspective view of a known recording and/or reproducing apparatus showing a state in which the tape is drawn at the supply side when the cassette is loaded.

In FIG. 4, an inclined post 8 is fixed to a drum base 2.

A tape 11 is drawn by a guide 3 and a tension post 7 from a loaded cassette, and is wound onto the inclined post 8.

When the guide 3 draws the tape 11 upwardly for forming a predetermined tape path, the tape 11 is loosen at the upper part of the guide 3. Therefore, the tape 11 tends to be removed or is removed from a flange 3*a* of the guide 3, the flange 3*a* serving to restrict the position of the tape The tape 11 is damaged by the flange 3*a* which the tape 11 runs on, even when the tape 11 is not removed from the flange 3*a*.

Figure 5:
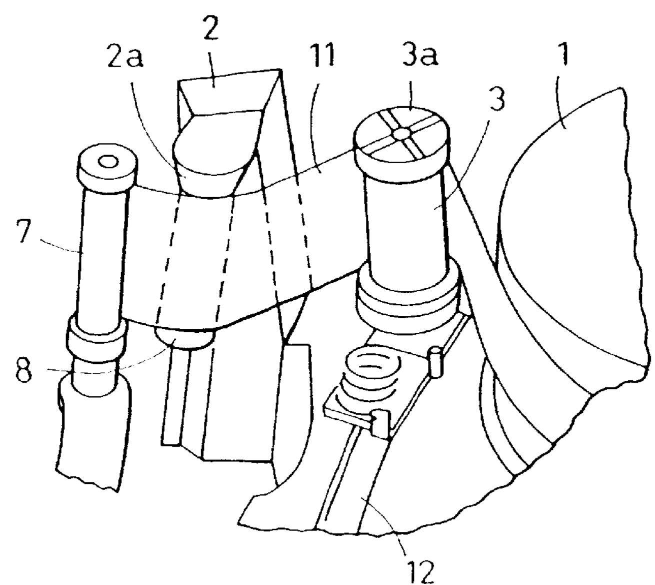
FIG. 5 is a perspective view of a recording and/or reproducing apparatus according to a first embodiment of the present invention, which loads a tape by using a guidepost.

FIG. 5 is an illustration of a part of the recording and/or reproducing apparatus which is used generally in the embodiments according to the present invention, in which the tape 11 is loaded.

In FIG. 5, a tapered part 2*a* is formed on the drum base 2 at an upper part of the inclined post 8, the tapered part 2*a* being formed coaxially with the inclined post 8.

In FIG. 5, the tape 11 is drawn by the supply-side guide 3 and the tension post 7 in the same manner as described in FIG. 4, and is guided to the inclined post 8 as the supply-side guide 3 moves upward. In this case, upward tension is produced to the tape 11 with the loose of the tape 11 being removed by being pulled by the tapered part 2*a* formed at the upper part of the inclined post 8. An upward movement of the tape 11 is restricted by the flange 3*a* of the supply-side guide 3 because of the produced tension, whereby the tape 11 is prevented from being removed.

Figure 6A:
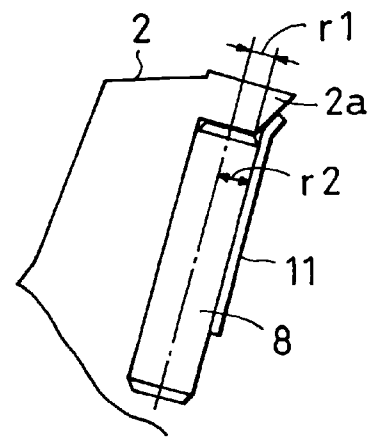
FIG. 6A is a side view showing the shapes of an inclined post and a tapered part, according to the first embodiment.

FIG. 6A is a side view showing the shapes of the inclined post 8 and the tapered part 2*a*.

In FIG. 6A, a radius r1 of the tapered part 2*a* at an end thereof at the side toward the inclined post 8 is set smaller than a radius r2 of the inclined post 8, whereby the tape 11 is prevented from being damaged by the end of the tapered part 2*a* when the tape 11 slidingly moves upward and in the width direction of the tape 11 along the surface of the inclined post 8 during the loading operation.

Figure 7:
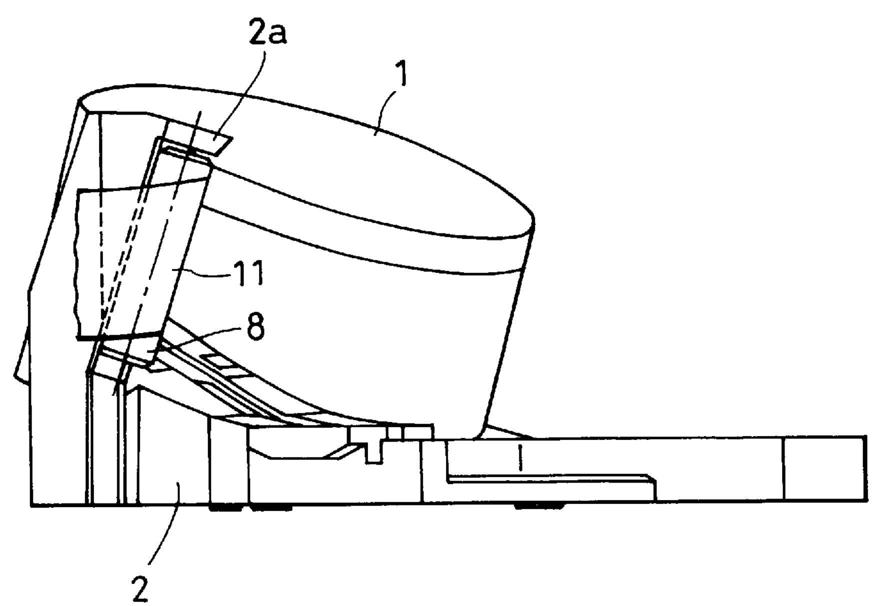
FIG. 7 is a side view of the tape, the inclined post, and the tapered part, in which a tape path is formed in the recording and/or reproducing apparatus according to the first embodiment of the present invention.

FIG. 7 is a side view of the tape 11, the inclined post 8, and the tapered part 2*a*, in which a predetermined tape path is formed. The tapered part 2*a* is not in contact with the tape 11 when tape loading is completed and the tape path is formed, as shown in FIG. 7.

Although the magnetic surface of the tape 11 is in contact with the tapered part 2*a* during tape loading, the magnetic surface of the tape 11 is not in contact with the tapered part 2*a* when the tape 11 is in a running state. Therefore, the running load of the tape 11 in the running state can be kept stable.

In a recording and/or reproducing apparatus according to a first embodiment of the present invention, the tapered part 2*a* is formed integrally with the drum base 2.

Since the drum base 2 is generally made of a resin (for example, PEI), the tapered part 2*a* is also made of the resin.

Figure 6B:
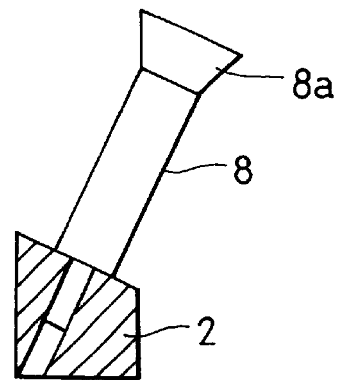
FIG. 6B is a side view showing the inclined post and the tapered part formed integrally with each other, according to the first embodiment.

The tapered part 2*a* may be made of a metal integrally with the inclined post 8, as shown in FIG. 6B.

Figure 6C:
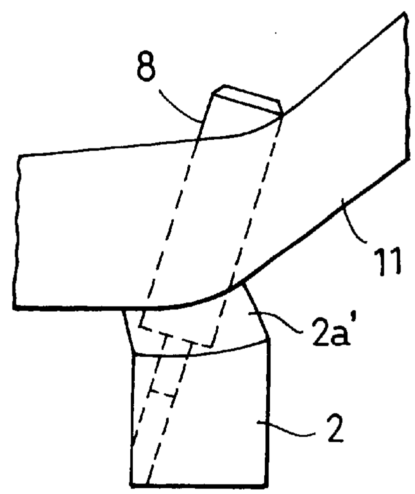
FIG. 6C is a side view showing the tapered part and a drum base formed integrally with each other, according to the first embodiment, in which a portion of the tapered part for restricting the position of the tape loaded is formed as a spiral.

Although according to the first embodiment, a tapered part is provided at an upper end of the inclined post 8 so as to restrict the upward movement of the tape 11, the tapered part may be formed at a lower end of the inclined post 8. FIG. 2C shows a tapered part 2*a*' provided at the lower end of the inclined post 8. Since the tapered part 2*a*' shown in FIG. 6C is made of a resin integrally with the drum base 2, wider freedom in designing the shape of the tapered part 2*a*' is provided, and therefore, an end face of the tapered part 2*a*' is formed in a spiral shape along an edge of the tape 11 in the running state. The tapered part 2*a*' thus formed can restrict the downward movement of the tape 11 during tape loading.

(Second Embodiment)

A method for fixing the inclined post 8 to the drum base 2, according to a second embodiment of the present invention, is described below with reference to the drawings. By using the method, the inclined post 8 is bonded to the drum base 2 in the recording and/or reproducing apparatus according to the first embodiment which is provided with a tapered part formed integrally with a drum base, for restricting the vertical movement of a tape.

FIG. 8A is a side view of an inclined post 8 fixed to a drum base 2. FIG. 8B is a view, in a direction of arrows D, of the inclined post 8 and the drum base 2 shown in FIG. 8A. FIG. 8C is an expanded view of the inclined post 8 fixed to the drum base 2 by bonding.

The drum base 2 is provided with a groove having a V-shaped cross-section at a lower part of the drum base 2 shown in FIG. 8A, the V-shaped cross-section having an angle $\theta(\theta>90°=\text{approximately } 100°)$. The bottom of the groove having a V-shaped cross-section is provided with a curved surface having a curvature radius R which is slightly smaller than a radius r2 of the inclined post 8 so that the bonded area between the inclined post 8 and the surface of the groove is increased.

The groove is provided chamfers C each at an edge of the groove so that an adhesive does not leak to the front surface of the inclined post 8.

Figure 9:
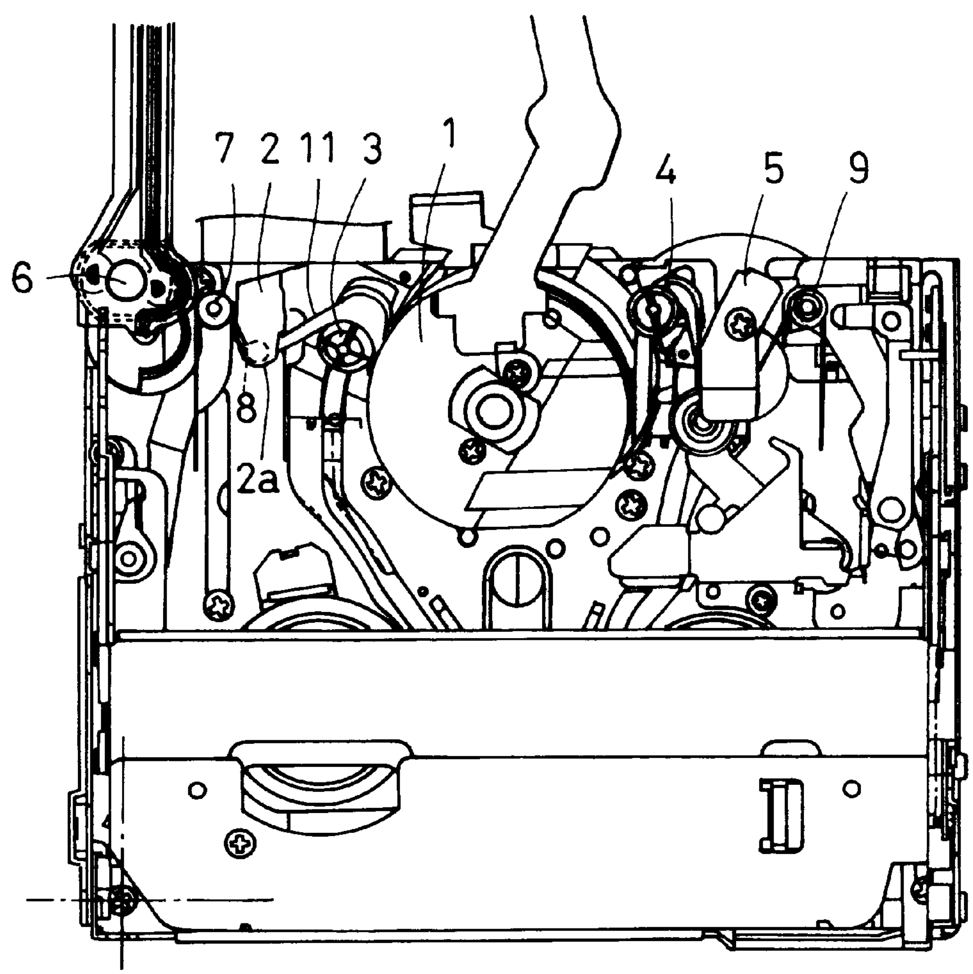
FIG. 9 is an illustration of the magnetic recording and/or reproducing apparatus according to the second embodiment of the present invention, in which a tape is wound.

FIG. 9 is an illustration of a recording and/or reproducing apparatus, according to the second embodiment, in which the tape 11 is wound onto the drum 1.

The V-shaped groove is positioned at the outer side of the wound tape 11; therefore, a pressing force is applied to the inclined post 8 in the bonding direction at the V-shaped groove with the tension of the tape 11.

As described above, the stress such as distortion applied to the tape 11, when loaded, can be reduced by the tapered part 2*a* with which the tape 11 comes into contact when loaded to the inclined post 8. Damages to the tape 11 can be avoided even when the tape path is narrow, whereby a recording and/or reproducing apparatus reduced in size can be provided.

When the tapered part 2*a* is formed integrally with the drum base 2, the tapered part 2*a* can be made accurately at low manufacturing costs. When the drum base 2 is provided with the groove having a V-shaped cross-section for the inclined post 8 to be bonded thereto, as described in the second embodiment, a mold for forming the drum base 2 can be divided into an upper and lower sub-molds, whereby the mold can be manufactured at a low cost.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording and/or reproducing apparatus for recording and/or reproducing data by drawing a tape from a cassette and winding the tape onto a rotating drum including a head, the recording and/or reproducing apparatus comprising:

a non-rotatable inclined post for changing the position of the tape in a direction crossing the running direction of the tape and along the axis of the inclined post; and a tapered part disposed in the vicinity of an end of the inclined post, for restricting the position of the tape in a direction crossing the running direction by being in contact with the tape when the tape is loaded, wherein the tapered part is formed coaxially with the inclined post such that the tapered part protrudes so as to cover the inclined post at an upper end thereof, and the radius of the tapered part is smaller than the radius of the inclined post at an end of the tapered part toward the inclined post at which end the tapered part has a radius smaller than the radius at the other end thereof, whereby an outer surface of the tapered part at the end toward the inclined post is withdrawn from the outer surface of the inclined post so that the end of the tapered part toward the inclined post does not come into contact with the tape when the tape is wound onto the inclined post.

2. An apparatus according to claim 1, wherein the tapered part is formed integrally with a drum base which supports the drum.

3. An apparatus according to claim 2, wherein the drum base is made of a resin.

4. A recording and/or reproducing apparatus for recording and/or reproducing data by drawing a tape from a cassette and winding the tape onto a rotating drum including a head, the recording and/or reproducing apparatus comprising:

a non-rotatable inclined post for changing the position of the tape in a direction crossing the running direction of the tape and along the axis of the inclined post;

a vertical-position-restricting member integrally formed at an upper end of the inclined post, for restricting the position of the tape in a vertical direction, wherein the vertical-position-restricting member for the tape is formed integrally with a drum base which supports the drum.

5. A recording and/or reproducing apparatus for recording and/or reproducing data by drawing a tape from a cassette and winding the tape onto a rotating drum including a head, the recording and/or reproducing apparatus comprising:

a non-rotatable inclined post for changing the position of the tape in a direction crossing the running direction of the tape and along the axis of the inclined post;

a vertical-position-restricting member provided at a lower end of the inclined post, for restricting the position of the tape in a vertical direction, wherein the vertical-position-restricting member for the tape is formed integrally with a drum base which supports the drum.

6. An apparatus according to claim 5, wherein the vertical-position-restricting member is formed as a spiral.

7. A recording and/or reproducing apparatus for recording and/or reproducing data by drawing a tape from a cassette and winding the tape onto a rotating drum including a head, the recording and/or reproducing apparatus comprising:

a non-rotatable inclined post for changing the position of the tape in a direction crossing the running direction of the tape and along the axis of the inclined post; and a drum base having a groove formed therein which has a V-shaped cross-section, the drum base being for supporting the inclined post such that the inclined post is fixed to the drum base at the groove thereof by bonding at a predetermined part of the inclined post.

8. An apparatus according to claim 7, wherein chamfers for receiving a leaked adhesive are each provided at an edge of the groove of the drum base having a V-shaped cross-section at which the inclined post is bonded.

9. An apparatus according to claim 7, wherein the V-shaped cross-section of the groove has an angle of 90 degrees or greater.

10. An apparatus according to claim 7, wherein the groove having a V-shaped cross-section is provided with a curved surface which has a curvature radius smaller than the radius of the inclined post.

* * * * *

UNITED STATES PATENT AND TRADEMARK OFFICE

CERTIFICATE OF CORRECTION

PATENT NO. : 6,801,385 B2
DATED : October 5, 2004
INVENTOR(S) : Hidetoshi Matsuoka It is certified that error appears in the above-identified patent and that said Letters Patent is hereby corrected as shown below:

Column 3,
Line 44, "tape" should read -- tape 11. --.

Column 4,
Line 62, "provided" should read -- provided with --.

Column 5,
Line 8, "Damages" should read -- Damage --.
Line 18, "an" should be deleted.

Signed and Sealed this

Twenty-eighth Day of June, 2005

JON W. DUDAS
*Director of the United States Patent and Trademark Office*